June 22, 1943.　　　　G. M. RAPP　　　　2,322,591
NONGLARE GLASS BUILDING BLOCK
Filed April 19, 1940　　　　3 Sheets-Sheet 1
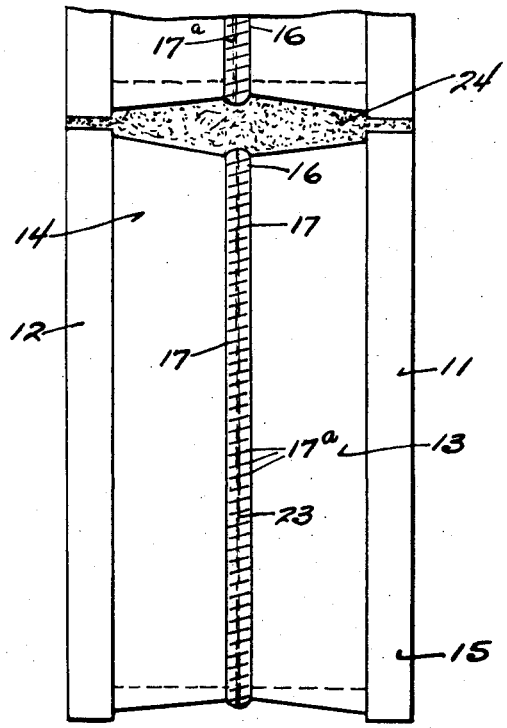
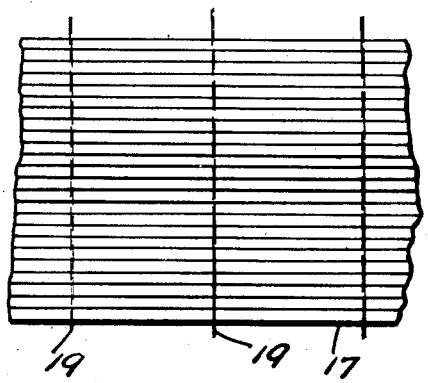
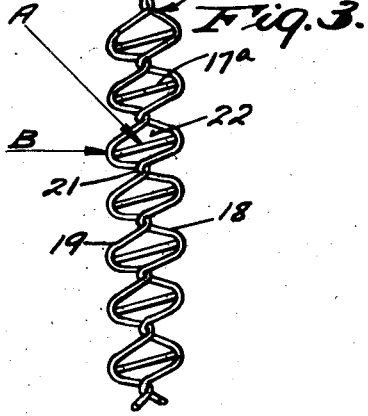
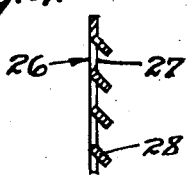
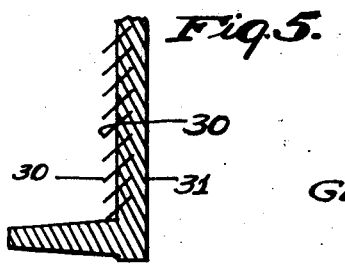
INVENTOR
GEORGE M. RAPP
BY Olan E. Bee
ATTORNEY June 22, 1943.   G. M. RAPP   2,322,591
NONGLARE GLASS BUILDING BLOCK
Filed April 19, 1940   3 Sheets-Sheet 2

INVENTOR
GEORGE M. RAPP
BY Olew E. Bee
ATTORNEY

Patented June 22, 1943

2,322,591

UNITED STATES PATENT OFFICE 2,322,591

NONGLARE GLASS BUILDING BLOCK

George M. Rapp, Mount Lebanon, Pa., assignor to Pittsburgh Corning Corporation, Allegheny County, Pa., a corporation of Pennsylvania Application April 19, 1940, Serial No. 331,593

5 Claims. (Cl. 88—60)

The present invention relates to building blocks and notably to hollow blocks of glass or similar material.

One object of the invention is to provide a hollow block of glass or other transparent material, which block when fabricated into a building wall in conventional manner is relatively free from glare and high lights produced by transmission of strong light from certain directions.

A second object of the invention is to provide a building block of the foregoing type in which the transmission of heat by radiation and convection is reduced to a minimum.

These and other objects of the invention will be apparent from consideration of the following specification and the appended claims.

A desirable improvement in glass building blocks, which now are found in extensive commercial use, could be effected by a reduction in the amount of light, notably sunlight, that is transmitted and which otherwise may produce an objectionable glare within the building in which the blocks are employed. Another improvement that could be made is a further reduction in the amount of heat transmitted by means of direct radiation, re-radiation and convection. According to the provisions of the present invention in its broader aspect, it is proposed to accomplish the foregoing improvement.

According to the provisions of the present invention in its broader aspects it is proposed to overcome the foregoing objectional features by provision within the block of a foraminous, louver-like screen of metal, the edges of which are designed to be embedded and secured in position in the glass of which the blocks are composed. Such screens effectively reduce the glare transmitted through the blocks notably in certain directions and at the same time prevent considerable amounts of radiational and convectional heat from passing through the blocks.

For a better understanding of the invention reference may now be had to the accompanying drawings in which like numerals refer to like parts throughout.

In the drawings

Figure 1 is a fragmentary cross-sectional view of a portion of a wall constituted of glass blocks and embodying the invention.

Figure 2 is a fragmentary elevational view of a portion of a screen suitable for use as a glare-reducing element in a glass block.

Figure 3 is a fragmentary cross-sectional view showing on a larger scale the constructional features of the screen shown in Figure 2.

Figure 4 is a fragmentary section of a modified form of screen.

Figure 5 is a fragmentary sectional view showing an alternative mode of mounting the screen in the block.

Figure 6:
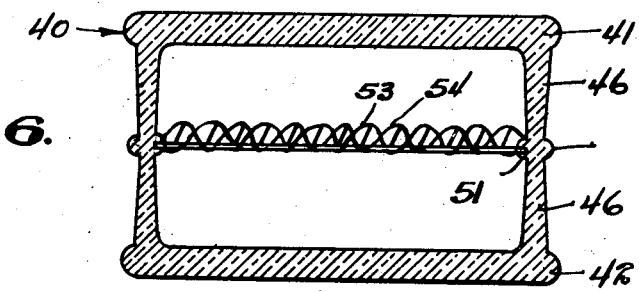
Figure 6 is a sectional view showing an additional form of screen.

Glass blocks for use in connection with the present invention may be of substantially conventional construction and preferably embodying two tray-like sections 11 and 12, which sections have edge lips 13 and 14 adapted to mate with each other and being secured together along their line of contact by welding or soldering. A zone or union involving a solder bond or weld is indicated at 16 in the drawings. If the halves of the blocks are to be welded together the glass is simply heated to the softening temperatures after which the edges to be joined are brought into contact with each other, thus effecting a permanent weld. A convenient method of forming a solder union involves preliminarily heating the glass, then dipping the edges of the lips 14 into molten solder and subsequently contacting the soldered edges while the solder is still sufficiently soft to provide a bond at the points of contact. Both of these methods are well known to those skilled in the art and extensive discussion thereof is not believed to be necessary.

In the fabrication of a block embodying an internal screen in accordance with the provisions of the present invention a foraminous sheet 17, formed of an appropriate metal such as copper, anodized or unanodized aluminum, steel, or the like, is simply interposed between the two halves of the block approximately parallel to the sides of the block before union is effected and halves are then brought together in accordance with conventional practice. The softened glass or the solder upon the edges of the glass (in accordance with the method of fabrication employed) flows through the interstices in a foraminous member, thus providing keys of glass or solder through the latter. The two halves of the glass are thus securely bonded together and the foraminous member is secured in position.

In the form of the invention illustrated the screen may comprise a series of small thin parallel bars 17a disposed at a slight angle with respect to the horizontal and so proportioned and spaced as in effect to constitute a series of small louvers. These bars are maintained in proper position with respect to each other by means of transverse wires 18 and 19 which are disposed at appropriate intervals throughout the width of the screen. Pairs of these wires, one upon each side of the screen are twisted together as indicated at 21 to provide eyelets 22 through which the rods or bars 17a extend. The fabrication of a screen of this type is well understood by those skilled in the art and the details need not be discussed.

When the screen is to be secured in position between the halves of a glass block a piece is simply cut to appropriate size and disposed between the halves. The latter of course are preliminarily provided along the edges of the lips with coatings of solder or the glass is preliminarily softened by heat so that when the two halves are pressed together, solder or glass flows between the bars 21, as indicated at 23 and the soft material from the lip of one-half contacts with and unites with corresponding material from the other half.

Screens of this type are particularly effective because the bars 17a may be so faced (for example upwardly) as to intercept strong lights, notably from the sky. Light transmitted along the line indicated at A in Figure 3 may thus be intercepted by the screen and redirected into the enclosure to be illuminated so as not to cause glare. In contradistinction, low incident light such as that transmitted along a line B, and which already is not critical in producing glare will pass through the screen with only slight reduction. It is thus possible to cut out the strong glare producing light from the sky or from some other direction while the more diffused non-glare producing light is transmitted to the interior of a building which is to be lighted.

The louver or directional effect above described can best be obtained where thin strips or bars appropriately spaced and faced are employed in the blocks. However, it is also possible to reduce the light passing through a block simply by employing therein an ordinary wire screen of such mesh as to produce the necessary reduction in the amount of light. The softened glass or solder will pass through the interstices of such screen and effectively bond the halves together.

It will be apparent that the louver-like screens may be suitably coated with a material of any satisfactory color for use in the screen. It is possible to coat the bars 17a upon one side with material of one color while the opposite faces of each bar is coated with a material of another color. For example, the sides of the bars facing outwardly and upwardly may be coated with a white or bright material, in order to obtain a strong outward reflection of light and heat entering the block. Transmission of heat from the outside to the interior of the building is thus reduced to a minimum. The inwardly and downwardly facing sides of the louver parts if desired may be coated with a dark heat absorbent coating material in such manner as to prevent backward reflection of heat from the screen to the interior of the room.

The screen not only reduces the transmission of radiant heat, but it will also be apparent that it acts as a barrier or obstruction to prevent the free circulation of air within the units. This reduction of the convectional flow of air materially reduces convectional losses of heat through the units. They also increase fire resistance of the units.

It will be apparent that if desired louver structures may be provided for the glass by simple embedment of small bars or strips in the glass along the line of union between the halves of the blocks. The use of the tie wires 18 and 19 is thus obviated.

If preferred the louver-like screen may be replaced by a simple sheet of metal such as iron, aluminum or copper, which is appropriately pierced in order to provide a foraminous member which will act to reduce the transmission of light through the screen. A screen of this type is illustrated in Fig. 4 in which a sheet 26 of metal is slotted as indicated at 27 and the edges of the slots are bent to provide louvers 28.

In the form of the invention shown in Fig. 5 a screen 30 is simply deposited loosely within the block 31.

Figure 7:
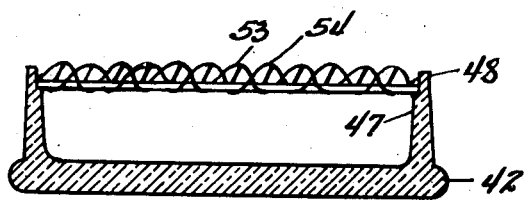
Figure 7 is a sectional view illustrating a stage in the forming of the block shown in Figure 6.

In the form of the invention shown in Figures 6 and 7 a hollow glass block 40 comprises mating sections 41 and 42, in which is disposed a louver-like screen 43 that is secured in the median plane of the block to rods 44. For purposes of securing the rods 44 in position in the block one of the mating halves may be provided with edge walls 46 having shoulders 47 disposed to engage and support the extremities of the rods. These shoulders may comprise continuous ledges extending about the inner perimeter of the blocks or may, if preferred, comprise small spaced ledges or bosses extending out sufficiently to engage the ends of the rods. A portion 48 of the perimetric wall of the half of the block projects substantially above the rods 44 and in the assembly of the halves this portion is heated to the softening point and is joined in conventional manner with the upper half 41 of the block. The two halves may be so squeezed together as to cause the softened edges to be spread to form an outer bead 49 and an inner bead 51 in which the extremities of the rods 44 are embedded approximately as indicated in Figure 6.

The edges of the flat bars 52 constituting the screen 43 may be attached to the rods 44 in any convenient manner. For example, they may be simply slightly brazed or welded together at points 52a, shown in Fig. 8, by application of electrical current while the bars and rods are held in contact or if preferred they may be secured by light wires extending around the rods and all or certain of the adjacent bars. As shown in Figures 6 and 7 the wires tying the bars 52 together may be employed as means for securing a screen to the rods. For example, the wires 53 and 54 are passed upwardly and about the rods 44 to secure them in contact with the edges of the bars.

Figure 8:
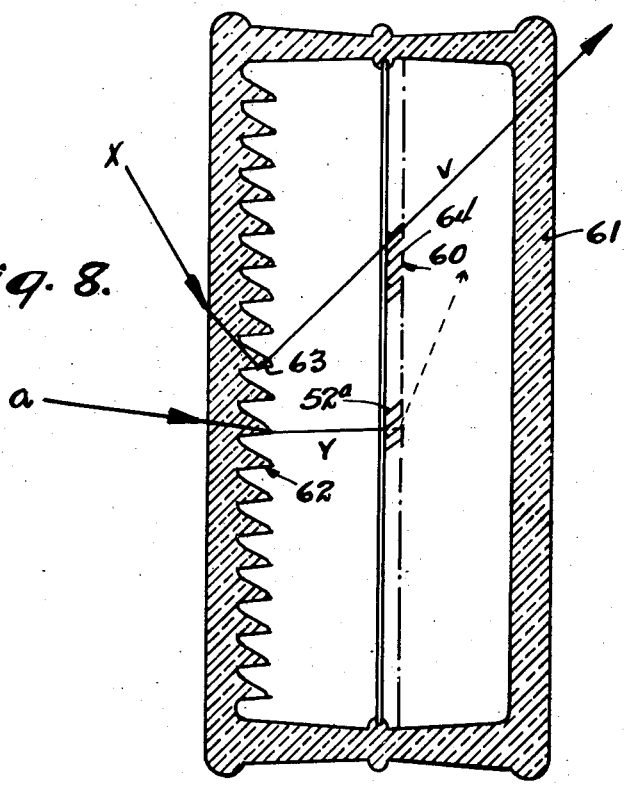
Figure 8 is a sectional view of a block embodying light-deflecting prismatic surfaces in combination with a louver-like screen.
Figure 9:
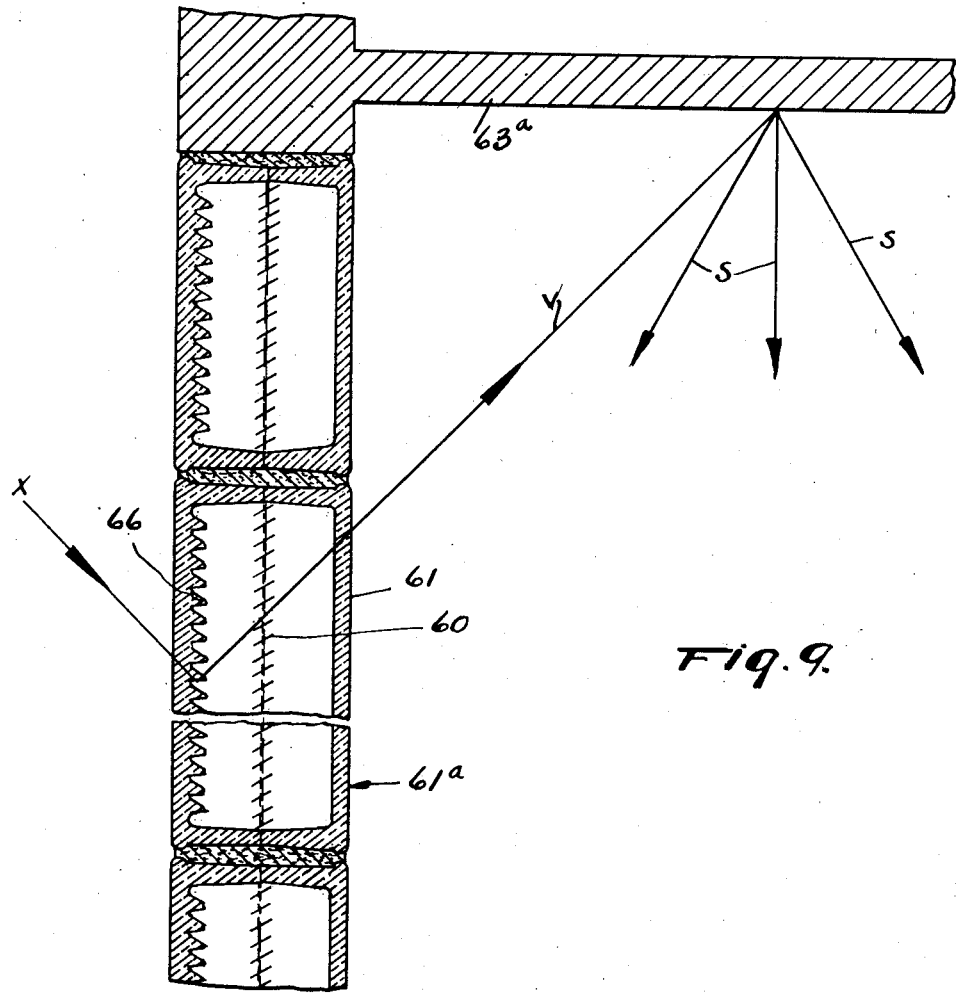
Figure 9 is a fragmentary sectional view illustrating the functioning of units such as shown in Fig. 8 in a building wall.

In the form of the invention shown in Figures 8 and 9, a screen 60 corresponding to those already described is employed in combination with a block 61 in a wall 61a. Each block has prismatic flutings 62 formed in one or both of the inner faces thereof so formed that a light beam x striking the lower face 63 thereof is bent upwardly along the line v to strike the ceiling 63a of the room to be illuminated by the blocks. From the ceiling the light is diffused along lines s, thus giving indirect illumination. The bars 64 of the screen 60 are so spaced and sloped as to permit practically all of the illumination passing along the line v to pass. However, light travelling approximately in a horizontal plane along the line y will be intercepted. If the surfaces of the bars 64 are dark, most of the light striking them is absorbed. However, it is also permissible to coat the bars with a highly reflective material, in which case the horizontal component will be reflected upwardly along the line z and will be diffused from the ceiling. This horizontal component of light is that which normally directly strikes the eyes of a person in the room and is objectionable. It may result from light which strikes the exterior face of the block approximately in a horizontal plane or it may comprise the component striking the more or less rounded corners of the flutings 62 in such manner as to be diffused or scattered by the latter. With this type of construction it will be apparent that a very large proportion of the light striking the exterior surface of a block is passed through in such manner as to produce efficient illumination of the interior of the building without producing objectionable glare and that only a minimum of light is intercepted.

The prismatic unit is essentially one that takes relatively high incident light and redirects it in an upwardly direction into the enclosure to be iluminated, which enclosure must be provided with a highly reflective ceiling surface, which in turn will reflect the light downward on the working plane. Due to certain limitations in the method of manufacture of such units, certain small components of this high incident light, particularly strong sunlight, cannot be thus precisely controlled, and as a result are transmitted either horizontally or downwardly through the block within the range of critical vision, and so produce glare. The object of the invention when used in this type of unit is to intercept such uncontrolled glare producing light and either reject it or redirect it so as to obviate the glare effect. In other words, the screen acts as a trap for undesirable light while simultaneously transmitting with high efficiency the useful controlled light.

It is apparent that the combination of prismatic flutings and louvers is applicable to other light-transmitting structures than glass blocks. For example, the outer sheet of a double glazed window unit may be provided with flutings and a louver screen may be disposed in the unit or within a room having such unit in order to permit the light to pass in a desired direction.

The assembly of glass blocks or bricks constructed in accordance with the provision of the present invention to form a wall follows conventional practice. The edges of the blocks are simply brought into mating relation with a layer 24 of cement interposed therebetween. The cement functions as a key between the blocks. It may be also adhered with considerable tenacity to the face of the glass, thus producing a more effective bond. It will of course be appreciated that in the construction of a wall of the improved block, assuming that the latter embody louver bars 17a, or lips 28, care should be taken so to face the bars or lips as to provide a barrier to light from the angle at which it is objectionable.

The forms of the invention herein disclosed are to be considered as illustrative. It will be apparent that numerous modifications may be made therein without departure from the spirit of the invention or the scope of the following claims.

What I claim is:

1. A hollow glass building block comprising tray-like sections providing opposed faces and having mating lips joined together to provide a hollow chamber and a non-glare screen disposed within the chamber in a plane approximately paralleling the faces, said screen comprising a light intercepting member secured to a plurality of parallel rods, the extremities of the rods being secured between the mating lips of the sections.

2. A building construction comprising a wall and a deck providing a side and the ceiling of a room, said deck having a relatively reflective lower surface, and said wall being formed of light-transmitting hollow glass blocks, which blocks have inner and outer sides, the inner surfaces of the outer sides being provided with parallel prismatic flutings directed horizontally and being disposed to deflect a substantial proportion of the light rays from the exterior of the room upwardly toward the deck and screens comprising louver bars disposed in the blocks in planes parallel to the sides of the latter, said bars being sloped upwardly and being spaced to pass the light deflected upwardly by the flutings, but to intercept light travelling horizontally through the blocks.

3. In a building wall a non-glare, light-transmitting construction for receiving light from an undesired direction and transmitting it in a desired direction, said construction comprising a plate-like portion of light-transmitting glass providing a surface of said wall, a screen juxtaposed to said portion in approximate parallelism thereto and on the side opposite that from which the light is received, said screen comprising parallel louver bars sloped in the direction in which the light is desired to travel and being so spaced as to pass most of the light travelling in the predetermined direction while intercepting that travelling in other directions, a face of said portion being provided with parallel prismatic flutings extending in the same direction as the bars and being formed to refract a substantial part of the light travelling in the undesired direction to the desired direction so that it will pass between the louver bars.

4. A non-glare, light-transmitting construction for receiving light from an undesired direction and transmitting it in a desired direction, which construction comprises a pair of parallel, spaced plate-like portions of light-transmitting glass interconnected to form a chamber, a screen secured within the chamber in approximate parallelism to the portions, the screen comprising spaced parallel louver bars sloped to transmit light travelling in the desired direction and to intercept light travelling in other directions, the inner face of the plate-like portion on the side from which light is received being provided with parallel prismatic flutings extending in the same direction as the louver bars and being disposed to deflect light travelling from an undesired direction to the desired direction in such manner as to pass between the louver bars.

5. A building construction comprising a wall and a deck constituting a side and the ceiling of a room, said ceiling having a relatively reflective lower surface, said wall being composed of hollow, light-transmitting glass blocks, said blocks each having a screen disposed in the interior thereof in a vertical plane and being composed of horizontal flat bars, said bars being spaced and being sloped upwardly and inwardly to permit the passage of light travelling upwardly toward the ceiling, but to intercept light passing horizontally.

GEORGE M. RAPP.